Dec. 30, 1969 J. RENNERT 3,487,377
DATA STORAGE SYSTEM WITH ORGANIC MEMORY
Filed July 21, 1966
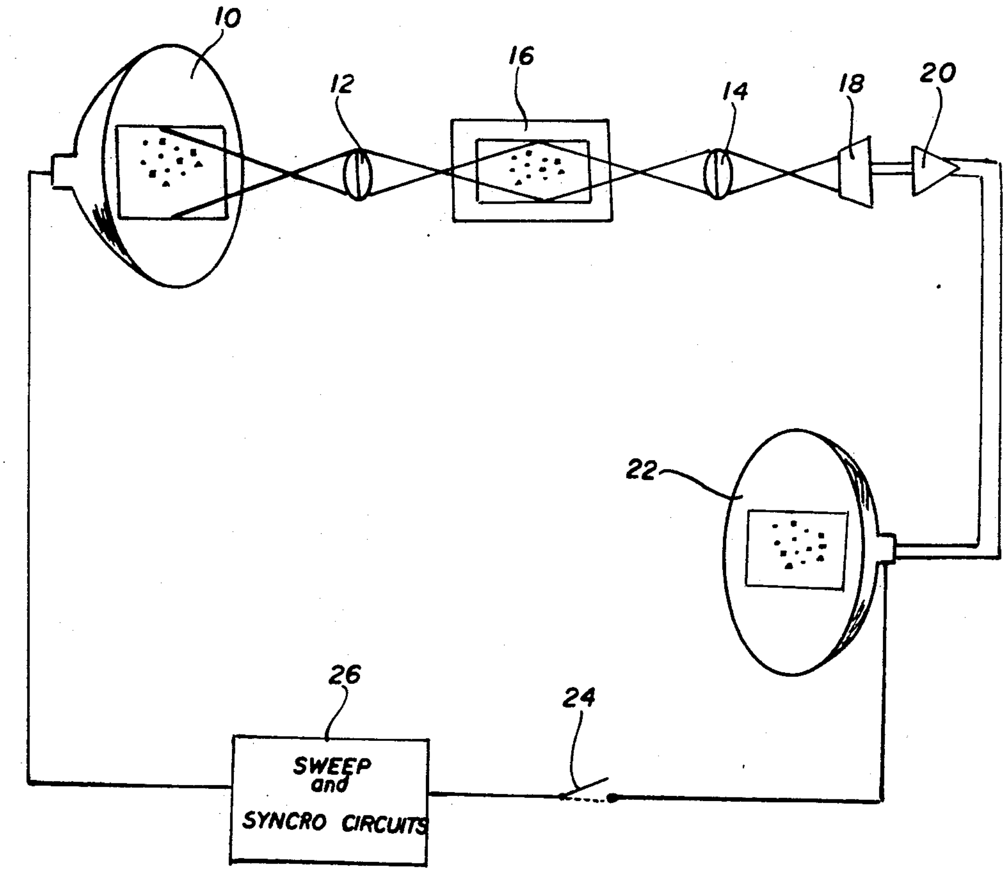
INVENTOR.
JOSEPH RENNERT
BY Alfred E. Miller
ATTORNEY United States Patent Office 3,487,377
Patented Dec. 30, 1969

3,487,377
DATA STORAGE SYSTEM WITH ORGANIC MEMORY

Joseph Rennert, 525 Fordham Place,
Paramus, N.J. 07652

Filed July 21, 1966, Ser. No. 566,832
Int. Cl. G11b 5/62
U.S. Cl. 340—173 8 Claims

ABSTRACT OF THE DISCLOSURE

An organic molecular storage unit containing an olefinically unsaturated organic compound capable of being photodimerized or the dimer thereof.

This invention relates to a new and improved data storage device. More particularly, this invention relates to a novel data storage device and to means for reading data in and out of said system.

Data storage systems employing organic memories are well known in the art. For example, such a system is described in U.S. Patent 3,119,099. The system in this patent employs, as a storage material, organic molecules capable of shifting between two or more atomic arrangements by the application of atomic energy. This system, however, has the serious drawback in being dependent upon the utilization of molecules in the meta-stable state which tend to return into the stable state thus limiting the time data can be stored.

A principal object of my invention therefore is to provide a stable data storage system employing a memory formed of organic substances. This and other objects of my invention will be apparent from the description that follows.

According to my invention, I employ as a memory material a mass of organic monomeric molecules capable of being photodimerized either by ultra violet or visible radiation or organic dimers capable of being decomposed into monomers also by the application of ultra violet or visible radiation.

The monomers employed in my system are unsaturated organic compounds containing carbon to carbon double bonds and in which the distance between double bonds in adjacent molecules do not exceed 5 Angstrom units.

Examples of compounds that may be employed are alpha-trans-cinnamic acid and naphthoquinone. Other examples of monomeric compounds that may be employed are 6-styryl-2, 4-dichloro-3-cyano-pyridine, stilbene, acenaphthylene, stilbamidine, 9-benzylidine-anthrone, binzylidine-phthalic anhydride, 2-benzal-quinoline,3,5-dimethylcyclohexenone, piperitone, 2-methyl-1,4-naphthoquinone, 2-phenyl-1,4-naphthoquinone, coumarine and 3-phenylisocoumarine. Further solutions of photopolymerizable substances in inert solvents may also be employed such as, for example, a solution of 1,4-naphthoquinone in benzene.

All these materials are bistable and are capable of being dimerized by the application of ultra violet or visible radiation of suitable frequency and intensity while the resultant dimers likewise are bistable and are capable of being decomposed into the component monomers by the application of ultra violet or visible radiation.

Thus, trans-cinnamic acid is dimerized by the application of ultra violet radiation of a frequency of 302 millimicrons and an intensity of .30 microwatt/cm.$^2$. Thus other frequencies that may be employed are 254 and 313 millimicrons with intensities up to 3 milliwatts/cm.$^2$. However, radiation of other wavelengths within the long wave ultra violet or visible light range may also be employed.

Data is stored in the memory system of my invention by selectively sweeping a surface of the monomeric or dimeric material employed with suitable dimerizing or monomerizing radiation thus producing dimers or monomers in selected locations in a surface of monomeric or dimeric material.

Data is read out of my system by sweeping the surface of material containing data with suitable radiation and determining the absorption of this radiation. Due to the difference in the amount of radiation absorbed by monomeric and dimeric material, the presence or absence of data containing centers may readily be determined.

If the bistable organic material is a solid it may be applied to a suitable transparent layer such as quartz by sublimation or by spraying an alcoholic solution on a hot quartz plate and allowing the solvent to evaporate.

If the bistable organic material is a liquid, it may be encapsulated in a transparent container for example, polystyrene, polymethylmethacrylate or polyvinyl alcohol.

A particularly useful procedure is to coat the outer surface of a cathode ray tube with the organic material and to employ the radiation of this tube either to read in or read out data. Of course, it is also possible to coat a transparent plate with the organic material and to temporarily secure the plate to the face of a cathode ray tube by metal fasteners or other means. In some cases, a single polycrystal may be employed which crystal may be mechanically mounted on the screen of a cathode ray tube. Data may be read in selected portions of the organic bistable material by sweeping the surface of this material through a screen in which only selected sites are transparent to the ultra violet or other radiation employed. Such a screen may be similar to the shadow mask such as is employed in color television receivers.

Data stored in a memory may be read out by sweeping the memory with ultra violet radiation from a first cathode ray tube, allowing the transmitted radiation from the memory to impinge on the face of a photomultiplier tube. The photomultiplier tube produces a signal the strength of which varies according to the ultra violet radiation received (the presence or absence of monomer). This varying signal is fed into the Z axis of a read out cathode ray tube whose sweep is coupled to the first tube. By employing a visibly fluorescing phosphor in the read out tube the presence or absence of dimer (therefore of stored data) is demonstrated by presence or absence of dimer in a given location in the memory.

In another embodiment of my invention, a layer of scintillation material is placed on the back of the memory. When the memory construction is swept with a beam of measuring radiation the layer the scintillation material lights up in a pattern corresponding to the presence of distribution of information stored in the memory. By employing photographic film of the proper response curve in place of or in addition to the scintillation material, it is possible to obtain a permanent record of the information stored in the memory.

Besides being stable, memories employed in my system have the advantage of having extremely large storage capacities. For example, cinnamic acid has a potential density of $10^{14}$ bits per square centimeter. Further, these memories have an additional advantage of exhibiting extremely fast reaction times, in the order of nanoseconds.

My invention will now be described in greater detail with reference to the accompanying drawing, the sole figure of which is a schematic drawing of a preferred embodiment of an apparatus embodying my invention.

This unit 16 consisting of a thin layer of α-transcinnamic acid deposited on a glass substrate is positioned to receive ultraviolet radiation from cathode ray tube 10 focused by collimating lens 12. Collimating lens 14 is positioned to focus radiation transmitted from the memory unit 16 on photomultiplier 18 the output of which is coupled to a video amplifier 20, the output of which is coupled into the Z axis of cathode ray tube 22. The horizontal and vertical sweep circuits of cathode ray tube 22 may be coupled through switch 24 with the sweep and synchronization circuits 26 of cathode ray tube 10.

Information is written on the memory unit 16 by placing switch 24 in the open position and causing ultraviolet radiation of a desired pattern to impinge on the thin film of α-transcinnamic acid. At those locations where the ultraviolet radiation impinges on the α-trans-cinnamic acid, photodimerization ocurs and α-truxillic acid is formed.

Information is read out of the memory unit with switch 24 is closed position. In this arrangement the horizontal and vertical sweep of cathode ray tube 10 is coupled to the horizontal and vertical sweep circuits of cathode ray tube 22. Ultraviolet radiation from cathode ray tube 10 is caused to impinge successively the surface of the memory 16 The presence or absence of the dimer (α-truxillic acid) of the α-trans-cinnamic acid is indicated by the intensity of ultraviolet radiation transmitted through the memory to the photomultiplier 18. The signal from the photomultiplier tube is amplified by amplifier 20 and fed into the Z axis of cathode ray tube 22 upon the screen of which a visible pattern appears corresponding to the intensity of the transmitted radiation. In order to erase stored information all of the surface of memory unit 16 is swept by ultraviolet radiation from cathode ray tube 10 of an intensity sufficient to cause irradiated dimeter (α-truxillic acid) to be monomerized to α-trans-cinnamic acid.

What I claim is:

1. A data storage device comprising in combination an organic memory consisting essentially of at least one organic compound selected from the group consisting of a carbon-to-carbon unsaturated organic monomeric compound (a) wherein the distance between the double bond and adjacent molecules is less than 5 Angstroms and the dimer (b) of said monomeric compound, both the monomeric compound (a) and the dimer (b) being shiftable, each to the other, in response to ultraviolet or visible light radiation of suitable wave length range, a first radiation means for selectively applying radiation of a wave length capable of causing a shift between the monomeric compound (a) and the dimer (b) to selected portions of said organic memory, a second radiation means for selectively irradiating selected portions of said organic memory with radiation of a frequency capable of being absorbed by the monomeric compound (a) or the dimer (b)

but incapable of causing a shift between the monomeric compound (a) and the diameter (b) and detector means for determining the absorption of the radiation from said second radiation means impinging on the selected portions of said organic memory to thereby determine the presence of the monomeric compound (a) or the dimer (b) at selected portions of said organic memory.

2. The data storage system of claim 1 wherein the memory consists essentially of organic monomeric molecules.

3. The data storage system of claim 2 wherein the organic monomeric molecules are photodimerizable by means of ultra violet radiation.

4. The data storage system of claim 3 wherein the organic monomeric molecules are molecules of alpha trans-cinnamic acid.

5. The data storage system of claim 3 wherein the organic monomeric molecules are molecules of naphthoquinone.

6. The data storage system of claim 2 wherein the memory consists essentially of solid organic monomeric compounds.

7. The data storage system of claim 2 wherein the memory consists essentially of liquid organic monomeric compounds.

8. The data storage system of claim 2 wherein the memory consists essentially of photodimerizable organic monomeric molecules dissolved in an inert solvent therefor.

References Cited

UNITED STATES PATENTS 3,119,099 1/1964 Biernat ---------------- 340—173

FOREIGN PATENTS 845,939 8/1960 Great Britain.

OTHER REFERENCES

Nicholas J. Turro, Molecular Photochemistry, W. A. Benjamin, Inc., N.Y., 1965, pp. 200–207.

Richard Exelby and Roger Grinter, "Phototropy (or Photochromism)," Chemical Review, 65, 1965, pp. 247–260.

BERNARD KONICK, Primary Examiner

J. F. BREIMAYER, Assistant Examiner

U.S. Cl. X.R.

204—158; 350—160